Patented Jan. 9, 1934

1,942,826

UNITED STATES PATENT OFFICE 1,942,826

METHOD FOR SEPARATION OF ORTHO- AND PARA-HALOBENZOIC ACIDS

Lindley E. Mills, Midland, Mich., assignor to The Dow Chemical Company, Midland, Mich., a corporation of Michigan No Drawing. Application March 6, 1930
Serial No. 433,823

11 Claims. (Cl. 260—108)

The present invention relates to the separation of halobenzoic acids from mixtures thereof, particularly ortho- and para-halobenzoic acids, and more particularly to a method for the separation of ortho- and para-chlorobenzoic acids from an aqueous solution of soluble salts thereof.

I have found that the above mentioned halobenzoic acids can be substantially separated from each other by fractionally reacting the same, or soluble salts thereof, with an alkali or acid, respectively, in the presence of water. My invention, then, consists of the procedure hereinafter fully described and particularly pointed out in the claims, the following description setting forth but a few of the various ways in which the principle of the invention may be used.

By way of illustration, my invention will be described below as applying to the separation of ortho- and para-chlorobenzoic acids from each other, particularly from an aqueous solution of soluble salts thereof, such as alkali-metal salts. For instance, ortho-chlorobenzoic acid is a stronger acid than the corresponding para compound. If, now, a suitable acid, e. g. a mineral acid, be added to a solution of sodium ortho- and para-chlorobenzoates, it will react preferentially with the para salt rather than the ortho salt. I have found that this differential reactivity of the two above mentioned isomeric acids is great enough to become the basis for a ready means of separation thereof. Furthermore, such separation may be carried out in any suitable way, such as by fractionally precipitating the chlorobenzoic acids from a solution of their soluble salts by a suitable mineral acid, or by fractionally dissolving said organic acids with alkali.

For instance, a mixture of ortho- and parachlorobenzoic acids may be stirred in the presence of water, and sufficient sodium hydroxide, or equivalent thereof, gradually added thereto to react with substantially all the ortho acid, the reaction mixture then being filtered, thereby obtaining the ortho acid in solution as a sodium salt thereof and the corresponding para acid as a residual solid.

By an alternative procedure, if a mineral acid such as hydrochloric or sulfuric acid, be added in a suitable manner to an aqueous solution of soluble salts of ortho- and para-chlorobenzoic acids, such as the sodium salts thereof, the para-chlorobenzoic acid will first be fractionally precipitated, and then the ortho acid will likewise be precipitated. The so precipitated chlorobenzoic acids may be successively separated from the liquor in any suitable way, such as by filtration thereof after they have been precipitated by the required amounts of mineral acid.

The above mentioned addition of alkali or mineral acid may be controlled in any desired way. For instance, the necessary amount of acid to be added to a solution of soluble salts of the chlorobenzoic acids to obtain the maximum separation of the latter acids, may be determined by means of color indicators, melting points of the precipitated acids, hydrogen-ion control, or equivalent thereof.

My present method may conveniently be operated by adding hydrochloric acid to an aqueous solution of sodium ortho- and para-chlorobenzoates at a temperature below approximately 75° C., until substantially all the para acid is precipitated, i. e. at a pH of about 4 to 5. After separation of the latter, the ortho acid may be recovered from the residual liquor in any preferred way. However, a preferred procedure is to acidify an aliquot portion of the particular solution of salts in question, with the mineral acid of the same nature and concentration as is to be used in effecting the actual precipitation of the desired acids, and to plot the hydrogen-ion concentration or equivalent thereof, against the amount of mineral acid used in the form of a graph. The required amount of the mineral acid may be calculated from the inflection point, on the graph, which shows the precipitation of substantially all the para acid, i. e. the point of maximum separation of ortho- and para-chlorobenzoic acids from each other, and added to the main part of the solution to attain such desired point therein; or, the pH corresponding to said point of inflection may be read from the curve, and sufficient mineral acid added to the main part of the solution until this pH value is reached, followed by separation of the acids in any desired way, as above mentioned.

The following examples illustrate various ways of carrying out my invention:—

*Example 1*

One liter of an aqueous solution containing 46 grams of mixed ortho- and para-chlorobenzoic acids as the sodium salts thereof, was acidified with 12 per cent hydrochloric acid to a pH of 4.5. Stirring was continued for 1.5 hours at 25° C. and the mixture then filtered, the precipitated para-chlorobenzoic acid being washed free of chlorides and dried. The filtrate therefrom was treated with hydrochloric acid until acid to Congo red indicator, the precipitated ortho-chlorobenzoic acid being separated from the residual solution by filtration thereof, washed free of chlorides and dried. By separating the acids in this manner, 10.1 grams of ortho-chlorobenzoic acid (melting point 134° C.) and 33.5 grams of para-chlorobenzoic acid (melting point 235° C.) were obtained; the total recovery amounting to 43.6 grams or the equivalent of a 95 per cent. recovery.

The melting points of pure ortho- and para-chlorobenzoic acids reported in the literature are 137° C. and 241° C., respectively.

Example 2

One liter of water containing 46 grams of freshly precipitated mixed ortho- and para-chlorobenzoic acids in the form of a thick mass, was stirred vigorously and 15 per cent. aqueous sodium hydroxide solution added slowly thereto until the pH of the solution reached 4.5. The solution was filtered after continued stirring of the reaction mixture for 0.5 hour, the residual para-chlorobenzoic acid being washed free of chlorides and dried. Ortho-chlorobenzoic acid was recovered from the filtrate by acidification thereof as above. By operating as herein described, ortho- and para-chlorobenzoic acids were obtained in yields of 10.1 and 33.5 grams, the acids having the melting points of 134° C. and 235° C., respectively.

Ortho- and para-bromobenzoic acids, or the corresponding fluoro acids, can be separated from mixtures containing such, or soluble salts thereof, in a similar way as above described.

In carrying out my invention, I prefer to operate the process at about room temperature and atmospheric pressure, although other temperatures and pressures may be employed. By operating at an increased temperature, for instance at about 90° C., the obtained chlorobenzoic acids are less pure than when the process is carried out at my preferred lower temperature.

My invention, accordingly, concerns the separation of ortho- and para-halobenzoic acids from a mixture containing them as free acids, or soluble salts thereof, in any suitable way which involves the preferential neutralization of the components of such mixture in the presence of water whether the process be operated as a fractional precipitation of the acids from soluble salts thereof, or a fractional solution of the acids by means of added base.

Other modes of applying the principle of my invention may be employed instead of those explained, change being made as regards the details herein disclosed, provided the means stated by any of the following claims or the equivalent of such be employed.

I therefore particularly point out and distinctly claim as my invention:—

1. The method of separating ortho- and para-halobenzoic acids from an aqueous mixture of compounds of said acids selected from the group consisting of the free acids and water-soluble salts thereof which comprises adjusting the pH value of such mixture to a point at which para-halobenzoic acid is present in free and undissolved form and ortho-halobenzoic acid is dissolved as a water-soluble salt thereof.

2. The method of separating ortho- and para-halabenzoic acids from an aqueous mixture of compounds of said acids selected from the group consisting of the free acids and water-soluble salts thereof which comprises adjusting the pH value of such aqueous mixture to between about 4 and about 5 to obtain a mixture of para-halobenzoic acid in free and undissolved form and ortho-halobenzoic acid dissolved as a water-soluble salt thereof, and separating the undissolved para-halobenzoic acid.

3. The method of separating ortho- and para-halobenzoic acids which comprises acidifying an aqueous solution of water-soluble salts thereof with a strong mineral acid in amount corresponding approximately to the quantity of para-halobenzoic acid present, separating the precipitated para-halobenzoic acid from the aqueous liquor, further acidifying the latter to precipitate ortho-halobenzoic acid, and separating the latter compound from the acidified mixture.

4. The method of separating ortho- and para-chlorobenzoic acids which comprises acidifying an aqueous solution of alkali metal salts of said acids with hydrochloric acid in amount corresponding approximately to the quantity of para-chlorobenzoic acid present, separating the precipitated para-chlorobenzoic acid from the aqueous liquor, further acidifying the latter to precipitate ortho-chlorobenzoic acid, and separating the latter compound from the acidified mixture, said steps being carried out at a temperature below about 75° C.

5. In a method of separating ortho- and para-chlorobenzoic acids from an aqeuous solution containing them in the form of sodium salts thereof, the steps which consist of adding a strong mineral acid to said solution at a temperature below about 75° C., until the latter reaches a pH value of approximately 4 to 5, separating precipitated para acid therefrom, adding additional mineral acid to the liquor, and separating precipitated ortho acid therefrom.

6. In a method of separating ortho- and para-chlorobenzoic acids from an aqueous solution containing them in the form of sodium salts thereof, the steps which consist of adding hydrochloric acid to said solution at a temperature below about 75° C., until the latter reaches a pH value of approximately 4 to 5, separating precipitated para acid therefrom, adding additional hydrochloric acid to the liquor, and separating precipitated ortho acid therefrom.

7. The method of separating ortho- and para-halo-benzoic acids from an aqueous mixture containing them which comprises adjusting the pH value of the mixture to approximately 4 to 5 to precipitate the para-acid therefrom.

8. The method of separating ortho- and para-halo-benzoic acids from an aqueous mixture containing them which comprises adjusting the pH value of the mixture to approximately 4 to 5 to precipitate the para-acid therefrom, at a temperature below about 75° C.

9. The method of separating ortho- and para-halobenzoic acids from a mixture thereof which comprises treating such mixture with an aqueous solution of an alkali metal base to obtain an aqueous mixture of para-halobenzoic acid in free and undissolved form and ortho-halobenzoic acid dissolved as an alkali metal salt thereof, and separating the undissolved para-halobenzoic acid.

10. The method of separating ortho- and para-halobenzoic acids from a mixture thereof which comprises treating such mixture with an aqueous solution of an alkali metal hydroxide until the mixture has a pH value between about 4 and about 5 whereby ortho-halobenzoic acid is dissolved as an alkali metal salt thereof and para-halobenzoic acid remains undissolved as the free acid, and separating the undissolved para-halobenzoic acid.

11. The method of separating ortho- and para-chlorobenzoic acids from a mixture thereof which comprises treating such mixture with an aqueous solution of an alkali metal hydroxide until the mixture has a pH value between about 4 and about 5 whereby ortho-chlorobenzoic acid is dissolved as an alkali metal salt thereof and para-chlorobenzoic acid remains undissolved as the free acid, separating the undissolved para-chlorobenzoic acid from the aqueous liquor, acidifying the latter with a strong mineral acid to precipitate ortho-chlorobenzoic acid, and separating the latter from the acidified mixture.

LINDLEY E. MILLS.